United States Patent [19]

Uemura et al.

[11] Patent Number: 4,835,609
[45] Date of Patent: May 30, 1989

[54] DATA PROCESSING DEVICE FOR READING CODED SIGNALS IN SYNCHRONIZATION WITH THE DISPLAY FREQUENCIES

[75] Inventors: Susumu Uemura, Kyoto; Yasuhumi Yatsuzuka, Yamatokoriyama; Hiroshi Tsujioka, Nara; Shigeru Shindoh, Yamatokoriyama; Tadashi Tomino, Yamatokoriyama; Shigeo Yoneda, Yamatokoriyama, all of Japan

[73] Assignee: Sharp Kabushiki Kaisha, Osaka, Japan

[21] Appl. No.: 940,407

[22] Filed: Dec. 11, 1986

[30] Foreign Application Priority Data

Dec. 23, 1985 [JP] Japan ................. 60-294970

[51] Int. Cl.⁴ .............................. H04N 7/08
[52] U.S. Cl. ..................... 358/142; 358/146
[58] Field of Search ......... 358/142, 146, 147; 340/707

[56] References Cited

U.S. PATENT DOCUMENTS 3,848,082 11/1974 Summers ................. 358/146
4,186,413 1/1981 Mortimer ................. 358/146
4,222,073 9/1980 Hirashima ............... 358/147

FOREIGN PATENT DOCUMENTS 0007912 12/1978 European Pat. Off. .
0013634 1/1980 European Pat. Off. .
3343226 6/1985 Fed. Rep. of Germany ...... 358/142
2034995 12/1987 United Kingdom .

OTHER PUBLICATIONS

Summers, George D., "The Data Dot TM System", Signal, vol. 29, #4, 1/75, pp. 35-42.

Primary Examiner—Edward L. Coles, Sr.
Assistant Examiner—David E. Harvey
Attorney, Agent, or Firm—Birch, Stewart, Kolasch & Birch

[57] ABSTRACT

A data processing device for reading a code signal output from the image output screen of a video receiver. The device is provided with a read controller to synchronize the code signal reading operation with the code signal display timing of the video receiver.

8 Claims, 3 Drawing Sheets

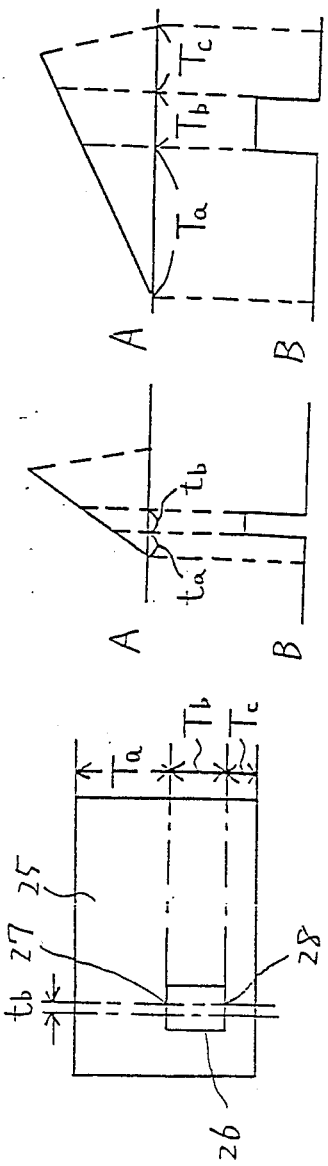

DATA PROCESSING DEVICE FOR READING CODED SIGNALS IN SYNCHRONIZATION WITH THE DISPLAY FREQUENCIES

BACKGROUND OF THE INVENTION

The present invention relates to a data processor for reading code signals displayed on a television receiver screen, or more specifically to a data processing device that reads code signals presented on a television receiver screen or a like medium to which the picture is outputted sequentially with a specified timing.

To display the code signal of data transmitted to a television receiver, on a part of the image output screen of the television receiver, the code signal must be output with a specified timing determined by the scanning lines of the television receiver.

For successive updating of the code signal with the specified timing, which is essential for mass data communication, it is necessary to accurately received code signals independently of the video data and synchronously with the specified updating timing.

With the conventional device, however, it is difficult to receive the code signal alone in synchronization with the specified timing when distinguishing between the code signal and video data. This hampers mass data communication.

SUMMARY OF THE INVENTION

An object of the present invention is to provide a data processing device which reads code signals successively outputted from a television receiver by receiving them synchronously as they are output to a predetermined area of the television receiver screen. The code signal output timing conforms in frequency and phase to the video signal output timing of the television receiver.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above object, an embodiment of the data processing device of the present invention comprises means for reading the code signal of data sent to and displayed on a television receiver with an image output screen and means for controlling the synchronization of the operation of the signal reading means with the code signal output timing on the television receiver screen.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 3A and B are charts of explaining horizontal synchronization signal;

FIG. 4A and B are charts for explaining vertical synchronization signal; and

FIG. 5 shows the display screen of the data processing device of FIG. 1.

DETAILED DESCRIPTION OF THE INVENTION

The construction of the present invention is described with reference to the accompanying drawings.

Figure 1:
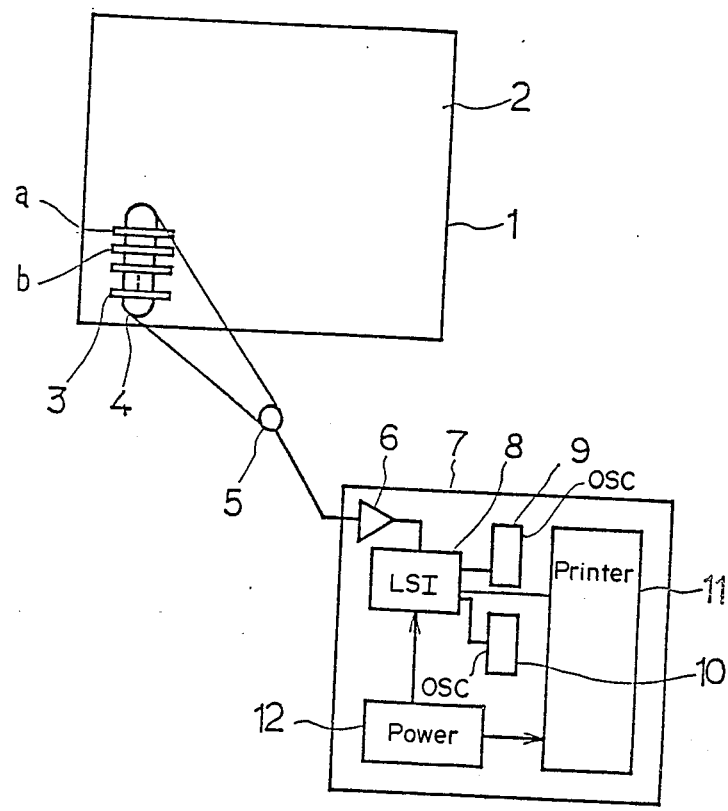
FIG. 1 is a schematic block diagram showing the construction of the data processing device of an embodiment of the present invention.

FIG. 1 is a block diagram schematically showing the construction of the data processing device of an embodiment of the present invention in which coded data is sent to the television receiver 1.

The television receiver 1 also receives ordinary video data. Code signal 3 is output to and displayed on a particular partial area, and the video data on the remaining area of the image output screen 2.

An optical sensor 5 faces the code signal display area of the screen 2 to optically receive the code signal 3 output to the light receiving zone 4.

The code signal received by the optical sensor 5 passes through an amplifier 6 and enters a LSI 8.

The LSI 8 is connected to two oscillators 9 and 10 to provide for synchronization with the display timing of the code signal 3 received by the optical sensor 5. The oscillator 9 oscillates at the vertical synchronization frequency and the oscillator 10 oscillates at the horizontal synchronization frequency of the television receiver 1.

The code signal read by the LSI 8 is converted to a predetermined letter, figure or symbol to be printed out by a printer 11 (or alternatively presented on a display).

12 is a power source for feeding the LSI 8 and the printer 11.

The code signal 3 is made of scanning lines of the television receiver screen 2. When a first code signal "a" is displayed at a given time, a second code signal "b" will be displayed after a certain period of time determined by the horizontal synchronization frequency, followed by subsequent code signals. This process continues for a specified period of time which is determined by the vertical synchronization frequency, until ultimately the entire code signal 3 is displayed.

According to the present invention, as mentioned above, the vertical and horizontal synchronization frequency oscillators 9 and 10 oscillate substantially at the vertical and horizontal synchronization frequencies, respectively, of the television receiver 1, thus synchronizing the reading of the optical sensor 5 to be in phase with the displaying of the code signal 3 on the television receiver 1.

Thus, it is possible to obtain the code signal alone independently of an image presented on the screen 2.

Figure 2:
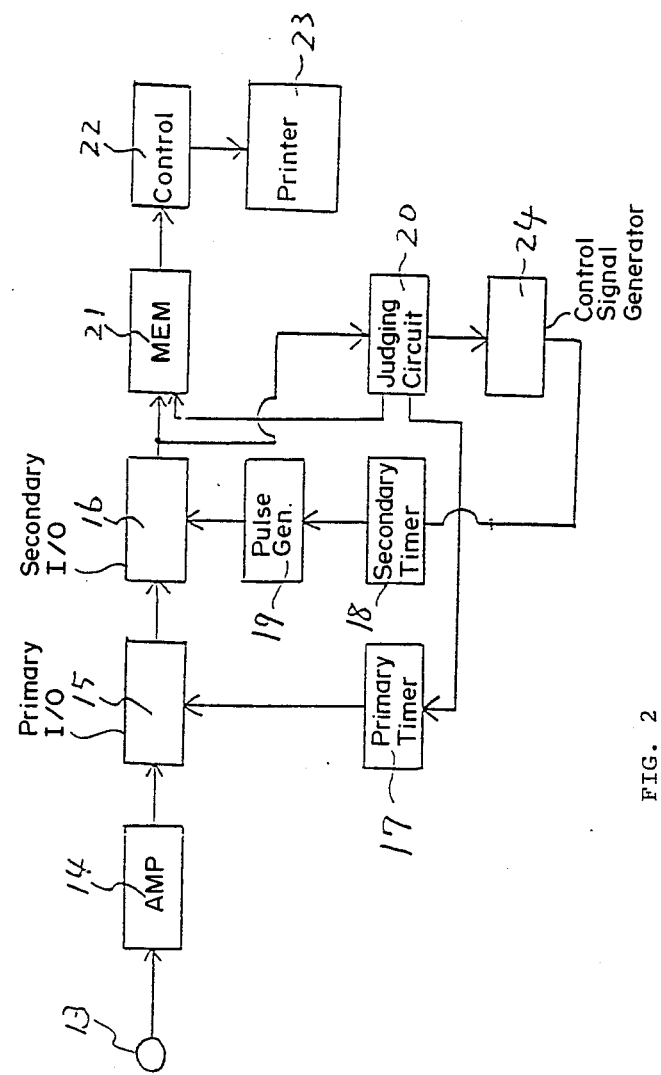
FIG. 2 is a detailed block diagram of the data processing device of FIG. 1.

Now the invention is described further in detail with reference to FIG. 2 that shows the detailed circuit construction of the present invention.

13 is an optical sensor. Code signal received by the optical sensor 13 passes through an amplifier 14 and enters primary I/O control 15 which controls the output of the data input from the amplifier 14. The output from the primary I/O control 15 enters a secondary I/O control 16 which controls the output of the data input from the primary I/O control 15. Data is outputted from the primary and secondary I/O controls 15 and 16 when they are at H (High) level.

17 is a primary timer for generating pulses synchronized with the horizontal scanning signal of the television receiver 1. The pulses are transmitted to the primary I/O control 15. On receiving a pulse from the primary timer 17, the primary I/O control 15 changes in its level from H (High) to L (Low) or vice versa.

The pulse generated by the primary timer 17 is described in detail with reference to FIG. 3.

FIG. 3A shows a horizontal scanning signal of the television receiver, with broken lines representing horizontal scanning retrace lines.

The television receiver 1 repeatedly outputs the horizontal scanning signal of FIG. 3A. In time frame "$t_a$" after the horizontal scanning signal generation, the primary timer 17 outputs a pulse of the width "$t_b$", as shown in FIG. 3B.

18 is a secondary timer for generating pulses synchronized with the vertical scanning signal of the television receiver. On receiving a pulse from the secondary timer 18, a pulse generator circuit 19 sends a pulse of a specified width to the secondary I/O control 16. The width of the pulse from the pulse generator circuit 19 is such that the code signal of data can be read vertically, as shown in FIG. 4.

FIG. 4A shows a vertical scanning signal output from the television receiver. In time frame, Ta, after the vertical scanning signal generation, the secondary timer 18 outputs the pulse of the specified width, causing the pulse generator circuit 19 to generate a pulse of the width "Tb".

On receiving a pulse from the pulse generator circuit 19, the secondary I/O control 16 changes in its level from H to L or vice versa.

20 is a circuit for judging whether or not the data received is a start code. Based on the judging result, it outputs particular signals to the primary timer 17, a memory circuit 21 and a control signal generator circuit 24 which are described later.

22 is a printer control and 23 is a printer.

Assuming that a code signal is displayed in the specified area 26 of the screen 25 of FIG. 5, the code signal is read when the pulses of FIG. 3B and FIG. 4B are output.

Operation of each component of the invention is described now.

At first, the primary and secondary I/O controls 15 and 16 are set at H level, so as to allow the output from the amplifier 14 to enter the secondary I/O control 16.

Therefore, the data received bhy the optical sensor 13 is transmitted through the amplifier 14 to the input of the memory circuit 21 and the judging circuit 20.

When the data is a start code, the judging circuit 20 sends control signals to the primary timer 17, cntrol signal generator circuit 24 and memory circuit 21.

Upon receiving the control signal, the primary timer 17 outputs a pulse to the primary I/O control 15, changing the level of the primary I/O control 15 to H (High) for the time frame "$t_b$" of FIG. 3 and to L (Low) for the other time frames.

The primary I/O control 15 does not output data signals when the level is L but only outputs them when the level is H.

The control signal generator circuit 24 outputs a control signal at time Tc+Ta of FIG. 4 after it detects the start code at the position 28 of FIG. 5. As a result, the secondary timer 18 outputs pulses, allowing the pulse generator circuit 19 to continue generating pulses of the specified width.

This causes the level of the secondary I/O control 16 to change to H (High) for the time frame "Tb" of FIG. 4 and to L (Low) for the other time frames.

The secondary I/O control 16 does not output data when the level is L but only outputs data when the level is H.

Thus, the code signal is read synchronously as the scanning point comes to the code signal output area to display the code signal. The memory circuit 21 stores the read code signal. The code signal is converted by the printer control 22 to a predetermined letter, figure or symbol before being output to the printer 23.

According to the present invention, as understood from the above, since the data processing device reads a code signal synchronously as it is displayed on the television receiver, it can read code signals successively output with the same timing as their display, thus increasing the data communication volume.

Other video (or image) receivers may be used in place of the television receiver.

While only certain embodiments of the present invention have been described, it will be apparent to those skilled in the art that various changes and modifications may be made therein without departing from the spirit and scope of the present invention as claimed.

What is claimed is:

1. A data processing device comprising:
   sensing means for reading code signals from an image output screen, said code signals displayed on said image output screen with a specific timing, said code signals having a start signal;
   synchronizing means, operatively connected to said sensing means, for synchronizing the reading of said code signals by said sensing means with the displaying of said code signals, thereby synchronizing the reading function of said sensing means with said specified timing used for displaying said code signals; and
   output means, operatively connected to said sensing means, for processing said code signals read by said sensing means into information that is understandable to an operator;
   said synchronizing means including,
      judging means, operatively connected to said sensing means and responsive to said start signal, for determining if said start signal has been read by said sensing means and for producing a control signal only when said start signal has been read by said sensing means,
      first oscillating means, operatively connected to said judging means and responsive to said control signal, for producing a first periodic signal being substantially synchronized with the horizontal scan frequency of the image processor, and
      second oscillating means, operatively connected to said judging means and responsive to said control signal, for producing a second periodic signal being substantially synchronized with the vertical scan frequency of the image processor,
      said first and second oscillating means, in response to said control signal, causing the synchronization of the reception of the code signals by the data processing device with the specified timing used for displaying the code signals.

2. A data processing device, for receiving data from an image processor having horizontal and vertical scan frequencies, the image processor displaying the data on an output screen, the data being code signals with a specified timing and a start signal, comprising:

sensing means for reading the start signal and code signals from the image processor output screen;

memory means, operatively connected to said sensing means, for storing the code signals read from the output screen by said sensing means; and timing means, operatively connected to said sensing means and said memory means and responsive to the start signal, for controlling the storing of the code signals in said memory means, thereby synchronizing the reception of the data by the data processing device with the specified timing, and for developing the code signals into a display in response to the start signal;

said timing means including, judging means, operatively connected to said memory means and said sensing means and responsive to the start signal for determining if the start signal has been read by said sensing means and for producing a control signal only when the start signal has been read by said sensing means, first oscillating means, operatively connected to said judging means and responsive to said control signal, for producing a first periodic signal being substantially synchronized with the horizontal scan frequency of the image processor, and second oscillating means, operatively connected to said judging means and responsive to said control signal, for producing a second periodic signal being substantially synchronized with the vertical scan frequency of the image processor, said first and second oscillating means, in response to said control signal, causing the synchronization of the reception of the code signals by the data processing device with the specified timing used for displaying the code signals.

3. The data processing device as claimed in claim 2, wherein said sensing means comprises:

start-up means for starting up the data processing device and for providing a start-up signal upon starting up the data processing device;

reading means for reading the code signals and start signal from the output screen;

primary input/output means, operatively connected to said memory means and said reading means and responsive to said first oscillating means, for transferring the read code signals from said reading means to said memory means only when said first periodic signal produced by said first oscillating means is at a high level; and secondary input/output means, operatively connected to said primary input/output means, said judging means, and said memory means and responsive to said second oscillating means, for tranasferring the read code signals from said primary input/output means to said memory means only when said second periodic signal produced by said second oscillating means;

said primary and secondary input/output means transferring the code signals read by said reading means in synchronization with the specified timing used for displaying the code signals on the image output screen; and said primary and secondary input/output means, in response to said start-up signal, enabling a transfer of the read start signal from said reading means to said judging means.

4. The data processing device as claimed in claim 3, wherein said sensing means further comprises:

amplifying means, operatively connected to said reading means and said primary input/output means, for amplifying the code signal ready by said reading means before the transferring by said primary input/output means.

5. The data processing device as claimed in claim 2, further comprising:

printer means, operatively connected to said memory means, for processing the stored code signals and for printing the processed code signals in a format understandable to an operator.

6. A data processing device for processing a start code and code signals received from a video screen, wherein the code signals are displayed with a specified timing and the video screen is controlled by an image processor having horizontal and vertical scan frequencies, comprising:

sensing means for reading from the video screen the start code and code signals being displayed;

judging means, operatively connected to said sensing means and responsive to the start code, for producing a control signal only when the start code is read by said sensing means;

timing means, operatively connected to said sensing means and said judging means and responsive to said control signal, for substantially synchronizing the reading of the code signals by said sensing means with the specified timing used for displaying the code signals on the video screen when said control signal is received; and processing means, operatively connected to said sensing means and said judging means, for storing the code signals redy by said sensing means and for processing the stored code signals into information understandable to an operator;

said sensing means including, reading means for reading the code signals and start code from the video screen, primary input/output means, operatively connected to said processing means and said reading means and responsive to said timing means, for transferring the read code signals from said reading means to said processing means only when a first periodic high level signal having a frequency substantially equal to the horizontal frequency of the image processor is received, said first periodic high level signal being produced bgy said timing means in response to said control signal, and secondary input/output means, operatively connected to said primary input/output means, said judging means, and said processing means and responsive to said timing means, for transferring the read code signals from said primary input/output means to said processing means only when a second periodic high level signal having a frequency substantially equal to the vertical scan frequency of the image processor is received, said second periodic high level signal being produced by said timing means in response to said control signal, said primary and secondary input/output means transferring the code signals ready by said reading means in synchronization with the specified timing used for displaying the code signals on the video screen, and said primary and secondary input/output means receiving a high level signal upon start-up of the data processing device, thereby enabling a transfer of the read start code from said reading means to said judging means.

7. The data processing device as claimed in claim 6, wherein said processing means further comprises:
printer means, for printing the processed code signals in a format understandable to an operator.

8. The data processing device as claimed in claim 6, wherein said timing means comprises:
first oscillating means, operatively connected to said judging means and responsive to said control signal, for producing said first periodic high level signal being substantially synchronized with the horizontal scan frequency of the image processor; and
second oscillating means, operatively connected to said judging means and responsive to said control signal, for producing said second periodic high level signal being substantially synchronized with the vertical scan frequency of the image processor;
said first and second oscillating means, in response to said control signal, causing the synchronization of the reception of the code signals by the data processing device with the specified timing used for displaying the code signals.

* * * * *